Jan. 24, 1961   G. B. BENANDER ET AL   2,969,442
DETENT MECHANISM FOR ALTERNATING CURRENT SWITCH
Filed July 30, 1958   2 Sheets-Sheet 1
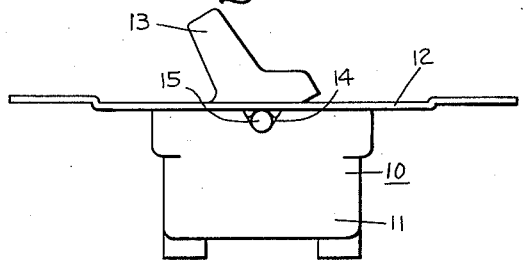
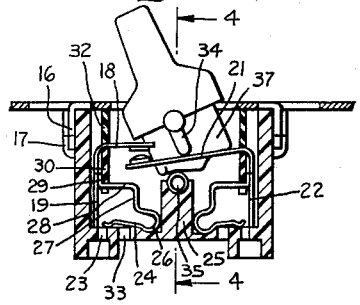
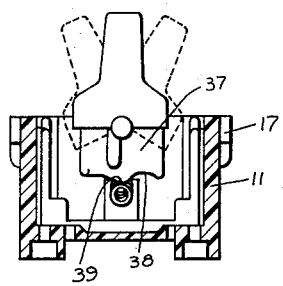
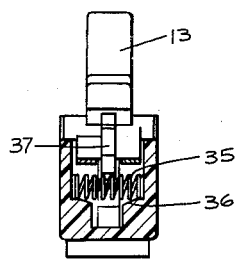
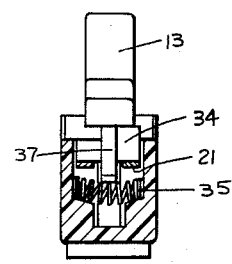
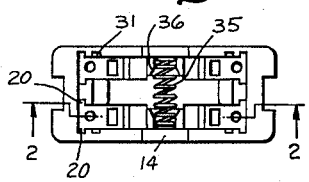
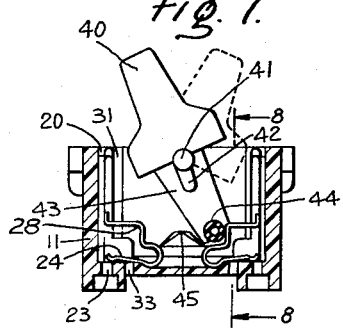
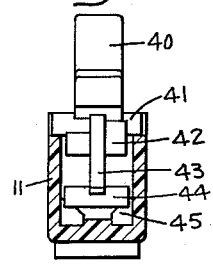
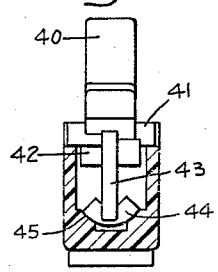
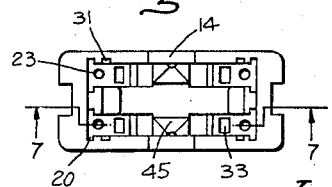
Inventors:
George B. Benander
Gustaf R. Lawson
by Richard L Caslin
Their Attorney.

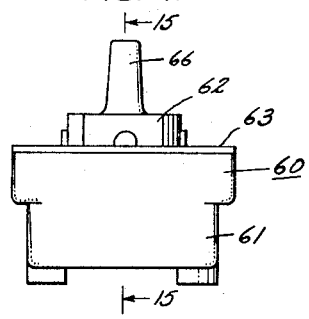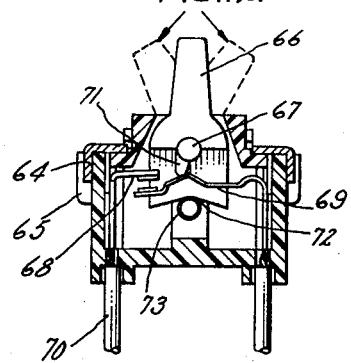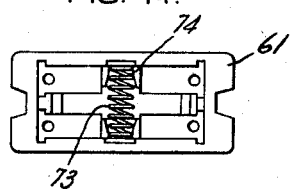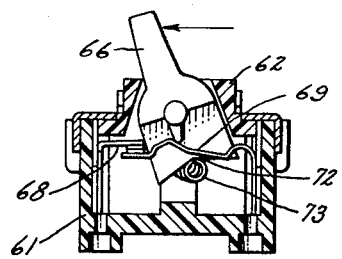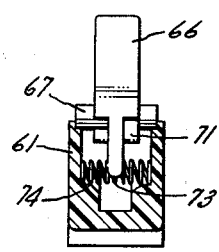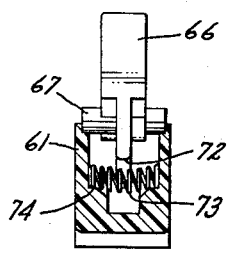
Inventors:
George B. Benander,
Gustaf R. Lawson
by Richard L. Caslin
Their Attorney

United States Patent Office 2,969,442
Patented Jan. 24, 1961

---

2,969,442

DETENT MECHANISM FOR ALTERNATING CURRENT SWITCH

George B. Benander, Oaklawn, and Gustaf R. Lawson, West Warwick, R.I., assignors to General Electric Company, a corporation of New York Filed July 30, 1958, Ser. No. 752,393

1 Claim. (Cl. 200—67)

The present invention relates to electric switches for use in alternating current circuits and particularly to a detent mechanism for throwing the switch trigger to a normal at-rest position when manual pressure on the trigger is released.

In the past, most electric switches for use in residential wiring were designed to be operated in both direct and alternating current circuits. However, for many years alternating current has been used almost exclusively in the home so that switches for home use need not be designed for the dual purpose of operating in both A.C. and D.C. circuits. A switch for alternating current use only is much simpler in design and lower in cost as well as being more quiet in operation. It is this quiet operation which has been found most desirable, which explains in part the extensive use today of silent mercury switches for use in the home.

This application is a continuation-in-part application of our original application Serial No. 568,735 which was filed on March 1, 1956, and is now abandoned.

We have illustrated two modifications of an overcenter detent mechanism in the drawing; the first showing a coil spring supported at its ends in suitable bearings at the sides of the switch housing, while the lower end of the trigger has a cam surface to deflect the central unsupported portion of the spring which tends to move the trigger to either one of its extreme at-rest positions when the trigger is released by the hand. The second modification shows a rubber-like cylindrical tube of resilient material transversely arranged in the bottom portion of the housing and carried at its center by the lower end of the trigger so that the opposite ends of the tube are engaged by convex cam surfaces at opposite sides of the housing which normally force the trigger to either one of its extreme at-rest positions when the trigger is released. Another species of this generic invention includes the cylindrical spring where the innermost end of the trigger has a central depression which fits over the spring. Hence, as the trigger is pivoted it will distort the spring so that the trigger is returned to a central position by the spring when manual pressure is released. This design gives the switch a momentary contact action when the movable contact of the switch is normally open at the same time that the switch trigger is in its normal central position.

Accordingly, the principal object of this invention is to provide a slow make and slow break electric switch with a novel detent mechanism that includes a cylindrical spring and serves to reduce the noise present in the operation of the switch trigger.

A further object of this invention is to provide an electric switch with a novel overcenter detent mechanism comprising a coil spring suspended between the side walls of the switch housing for cooperation with the cam surface on the lower end of the switch trigger to hold the trigger normally in one of its two extreme positions.

A further object of this invention is to provide an electric switch with a novel overcenter detent mechanism comprising a rubber-like tube or cylinder joined at its mid-portion to the lower end of the switch trigger so that the ends may cooperate with convex cam surfaces in the bottom of the switch housing for throwing the trigger to one of its two extreme positions.

A still further object of this invention is to provide an electric switch with a momentary contact action by means of a detent mechanism that includes a coil spring suspended between the side walls of the switch housing for cooperation with a central depression on the lower end of the switch trigger to hold the trigger normally in a central position.

Our invention will be better understood from the following description taken in connection with the accompanying drawings and its scope will be pointed out in the appended claim.

Figure 1 is a front elevational view of a slow make and break switch embodying our invention.

Figure 2 is a cross-sectional elevational view taken on the line 2—2 of the plan view of the switch base of Figure 6.

Figure 3 is a cross-sectional elevational view similar to that of Figure 2 showing the cooperation between the lower end of the switch trigger and the detent spring.

Figure 4 is a transverse elevational view taken on the line 4—4 of Figure 2.

Figure 5 is a transverse elevational view similar to that of Figure 4 when the switch trigger is momentarily in the central position shown in Figure 3.

Figure 6 is a top plan view of the recessed base of the switch housing showing the coil spring suspended in bearings from the opposite side walls.

Figure 7 is a second modification of our invention shown in a view similar to that of Figure 2.

Figure 8 is a transverse elevational view of the switch of Figure 7 similar to the showing of Figure 4.

Figure 9 is a transverse elevational view of the switch housing when the trigger is momentarily in its central position.

Figure 10 is a top plan view of the recessed base of the second modification of Figure 7 similar to the showing of Figure 6.

Figure 11 is a front elevational view of an electric switch having a momentary contact action embodying our invention.

Figure 12 is a cross-sectional elevational view taken on a vertical plane through the longitudinal center line of the switch housing and showing the switch trigger in its normal central position holding the movable contact open.

Figure 13 is a cross-sectional view similar to that of Figure 12 showing a force holding the switch trigger in its extreme left-hand position so as to allow the movable contact to close the circuit of the switch.

Figure 14 is a top plan view of the recessed base of the switch housing showing a coil spring suspended in bearings from the opposite side walls.

Figure 15 is a transverse elevational view taken on the line 15—15 of Figure 11.

Figure 16 is a cross-sectional view similar to Figure 15 but showing the trigger in the position of Figure 13 with the coil spring distorted by the manual pressure exerted on the trigger.

Referring in detail to the drawing, and in particular to Figures 1 and 2, 10 represents a hollow switch housing comprising a recessed base 11 molded of suitable insulating material and a steel mounting strap 12 which serves as a cover for the base as well as the means for supporting the switch in a switch box in a well understood manner. A switch handle or trigger 13 is also a molded part which is pivotally mounted in open bearings 14 in the opposite side walls of the base by means of trunnions 15 extending transversely of the trigger. The mounting strap 12 has a pair of lanced tabs 16 for engaging shoulders 17 at the opposite ends of the base to hold the strap onto the base and confine the switch parts in assembled relation.

The particular method of securing the movable and fixed contacts within the base as well as the screwless terminals for connection with wire leads do not form part of the present invention since they were claimed in application Serial No. 568,853 which was filed concurrently with our original application Serial No. 568,735. This related application Serial No. 568,853 has since issued as Patent No. 2,841,673 on July 1, 1958. However, for purposes of clarity, a brief description of these parts will be given. The fixed contact 18 is stamped out of strip material and it has a terminal end 19 that is slightly wider and extends at right angles to the main portion of the contact so that it may be slid down between opposed grooves 20 in the base, as best seen in Figure 6. The movable contact 21 is similar in over-all shape to the fixed contact 18 in that it is stamped of resilient strip material and has a right angular terminal portion 22 that is wider than the main portion of the contact so that it may be mounted in the opposed grooves 20 of the recessed base.

The screwless terminal connecting means of our switch is generally as shown in the Benander Patent No. 2,705,785 which is assigned to the same assignee as is the present invention. There is a wire-receiving opening 23 in the bottom wall of the base having one edge substantially in alignment with the terminal end of the contacts. A spring locking tongue 24 of strip material is seated in the base between each terminal end of the contact and a related partition 25 which is arranged generally parallel with the terminal. The free end of the locking tongue overlies one edge of the wire-receiving opening while the opposite end 26 of the tongue is formed at a reentrant angle to bear against the partition 25. From the reentrant end 26 of the locking tongue there extends a movable offset arm 27 that terminates in an anchoring strip 28 that is firmly supported in the base. A small notch is cut in opposite edges of the anchoring portion 28 while its free end 29 is bent upwardly. A rectangular shaped insulating plate 30 is supported at its side edges in the opposed grooves 31 in the side walls of the base while the lower edge of the plate 30 has a small notch to straddle the reduced section in the anchoring strip of each locking tongue. This insulating plate 30 is seated on top of the anchoring strip and is held down by either the fixed contact 18 or the movable contact 21 as the case may be. In turn, a second insulating plate 32 is disposed in the same grooves 31 of the base to be seated upon the contacts as well as to engage the underside of the strap 12. Finally, an access opening 33 is formed in the bottom wall of the base adjacent each wire-receiving opening 23 so that a suitable tool such as a screwdriver or nail may be forced into the base to deflect the locking tongue when it is necessary to disconnect the lead wire from the switch.

The trigger 13 is designed to pivot on its trunnions 15 between two extreme positions as shown in dotted lines in Figure 3. A small cam 34 extends downwardly below each trunnion for engagement with a related movable contact 21 in the case of a three-way switch. In the position of the trigger 13 shown in Figure 2, the cam 34 is holding the movable contact 21 away from the fixed contact 18 so that the circuit is open through the switch. It should be understood that as the trigger 13 moves to the right, the small cam 34 will move clockwise and allow the movable contact 21 to spring into engagement with the fixed contact 18. However, it is also necessary to provide a detent mechanism in the switch for forcing the trigger 13 to either of its two extreme positions when it is released. By this is meant that a person may not move the trigger a slight amount into an intermediate position which will be held when the trigger is released by the hand, for if such a situation could exist, it is possible that the contacts would be only slightly open so that an arc would jump across the short air gap and tend to burn out the contacts until the switch would be rendered inoperative. Thus, it is a prerequisite that a detent mechanism be provided in the switch for forcing the trigger into one of its two extreme at-rest positions.

Our first modification of an overcenter detent mechanism is shown in Figures 2–6 where a cylindrical coil spring 35 is suspended by its ends in bearings 36 arranged on the opposite side walls of the base. Since these bearings are raised off of the bottom floor of the base, the central portion of the spring 35 is unsupported for reasons which will be understood hereinafter. The bottom of the trigger 13 has a thin plate-like extension 37 which may fit between different sets of movable and fixed contacts such as in a three-way switch. The lower edge of this extension 37 constitutes a two-position cam with spring pockets 38 that are separated by a downwardly extending central point or tip 39. When the trigger 13 is in either of its two extreme positions the spring pocket 38 deflects the coil spring 35 little, if at all. However, when the trigger is moved toward its opposite position, the central tip 39 will depress the central portion of the spring as best shown in Figures 3 and 5. This tip 39 is so dimensioned that the trigger 13 is unstable in its central position so that it will slip off of the spring into either one of its two extreme positions. Once the trigger 13 is off center, the inherent resilience in the spring will tend to pivot the trigger into a predetermined position, depending upon the curvature of the spring pocket 38. This switch is relatively quiet, if not silent, because of the rubbing engagement between the trigger and the coil spring as distinguished from a slapping or rebounding action in the usual toggle switch having an overcenter spring. Most of the noise in this switch comes from the closing of the contacts but this is relatively minor in nature.

The second modification of our overcenter detent mechanism is illustrated in Figures 7–10 wherein like elements will be identified by the same reference numerals. Looking at Figure 7, the recessed base 11 is shown with the wire-receiving openings 23 and the access openings 33 as well as the opposed grooves 20 and 31 in the base for supporting the movable and fixed contacts as well as the insulating plates for holding the contacts as well as the spring locking tongue 24 firmly in place. The trigger 40 is slightly different than before although it still contains the trunnions 41 and the small cam surface 42 that engages the movable contacts. One change that has been made is that the lower end of the trigger has a redesigned plate-like extension 43 which is bifurcated at the bottom to engage the central portion of a rubber-like cylinder or tube 44. This tube is arranged transversely within the base to cooperate with a pair of convex cam surfaces 45 adjacent the bottom floor of the base so that as the trigger is moved back and forth, the ends of the tube will engage the cam surfaces 45 and be deflected upwardly as shown in Figure 9. The cam surfaces 45 are so shaped that the trigger 40 is in an unstable condition when centrally located so that as the trigger is released, the energy stored up in the tube 44 will be expended to drive the trigger to one of its extreme at-rest positions. As seen in Figure 7, the ends of the tube 44 engage an upwardly extending portion of the movable offset arm 28 of the spring locking tongue, which portion represents a stop means. This construction is particularly quiet because there is very little noise generated when the ends of the rubber tube 44 bound against the offset arms of the spring locking tongues.

It will be readily appreciated by those skilled in this art that we have provided an overcenter detent mechanism that serves the additional function of suppressing the noise of the trigger as it bounds between its two extreme at-rest positions. Our invention not only provides improved results over other known switches of the slow make and break type with the least number of parts, but it also simplifies the manufacture and assembly of the switch thereby lowering the cost of manufacture and, hence, the ultimate cost to the consumer. Exhaustive tests have been made of this switch and they conclusively prove the practicality of these designs and the reliability of operation.

A third species of this generic invention is shown in Figures 11–16 of the present drawings. Referring to Figures 11 and 12, 60 represents a hollow switch housing comprising a recessed base 61 of suitable insulating material and a removable cover plate 62 that is held over the base by a metal strap 63. This strap includes a bendable tab 64 at its opposite ends which is folded over to engage with suitable abutments 65 on the ends of the base as is well understood in this art. A switch handle or trigger 66 is also a molded insulating part and it is pivotally mounted by means of trunnions 67 in suitable bearings in the cover 62.

The switch includes at least one fixed contact 68 and a movable contact 69 with a free end that is engageable with the fixed contact for closing the circuit through the switch. These contact members are mounted in the housing in a well-known manner. As shown in Figure 12, lead wires 70 are brought in through the bottom side of the base 61 and are soldered or otherwise fastened to the terminal ends of the contacts.

Looking at Figure 12 of the drawings, the switch trigger 66 is shown in full lines in a central position with a lower abutment 71 extending from the trunnions 67 and bearing against the mid-portion of the movable contact 69 to hold the movable contact away from the fixed contact 68. This is the normal position of the switch trigger. The underside of the innermost end of the switch trigger 66 is provided with a central depression or groove 72. This depression fits over the mid-portion of a coiled spring 73 that is suspended between the opposite side walls of the base with its ends confined in the open bearings 74 as best seen in Figure 14. The longitudinal central axis of this coiled spring 73 is located directly below and parallel to the pivotal axis of the trigger 66. Accordingly, as seen in Figure 13, when the trigger is moved out of its central position, the innermost end of the trigger will distort or deform the spring, causing it to elongate and take the shape of a bowed spring, as best seen in Figures 13 and 16. However, when manual pressure is released from the trigger, the spring has enough potential energy to force the trigger to return to its normal central position of Figure 12 so that the spring will be de-energized. In the meantime, when the trigger is out of its normal central position, as seen in Figure 13, the abutment 71 of the trigger has moved aside to permit the resilient arm of the movable contact 69 to close the circuit with respect to the fixed contact 68. It will be understood, however, that when the spring 73 forces the trigger to return to its central position, the trigger will likewise return the switch to its normally open position of Figure 12.

Having described above our invention of a novel detent mechanism using a cylindrical spring extending endwise between the side walls of the switch housing, it will be readily apparent to those skilled in this art that it is possible to adapt this mechanism to either a slow make and slow break On-Off switch or a momentary contact action switch with a minimum number of parts and at an attractive low cost as compared with previous designs.

Modifications of this invention will occur to those skilled in this art and it is to be understood, therefore, that this invention is not limited to the particular embodiments disclosed but that it is intended to cover all modifications which are within the true spirit and scope of this invention.

What we claim as new and desire to secure by Letters Patent of the United States is:

An electric switch comprising a hollow housing, movable and fixed contacts positioned in said housing, a manually operable trigger movable about a pivotal axis between two at-rest positions, a detent on the base of said trigger engageable with said movable contact for changing the position of said contact, the base portion of said trigger having a bottom edge on the interior of the housing forming an indexing cam surface with two spaced spring pockets separated by a central tip, and a coil spring loosely supported in said housing axially parallel with the pivotal axis of said trigger, the central portion of said spring being engaged by said cam surface and displaceable by movement of said cam surface whereby said spring when in engagement with said spring pockets maintains said trigger in its at-rest positions.

References Cited in the file of this patent

UNITED STATES PATENTS

| | | |
|---|---|---|
| 1,351,161 | Fagerlund | Aug. 31, 1920 |
| 2,481,368 | Tiffany | Sept. 6, 1949 |
| 2,626,335 | Landin | Jan. 20, 1953 |
| 2,681,396 | Cole | June 15, 1954 |

FOREIGN PATENTS

| | | |
|---|---|---|
| 489,713 | Italy | Jan. 26, 1954 |
| 587,955 | France | Jan. 24, 1955 |